G. LOGAN.
SIGNAL LIGHT FOR AUTOMOBILES.
APPLICATION FILED JULY 13, 1915.
1,195,372.
Patented Aug. 22, 1916.
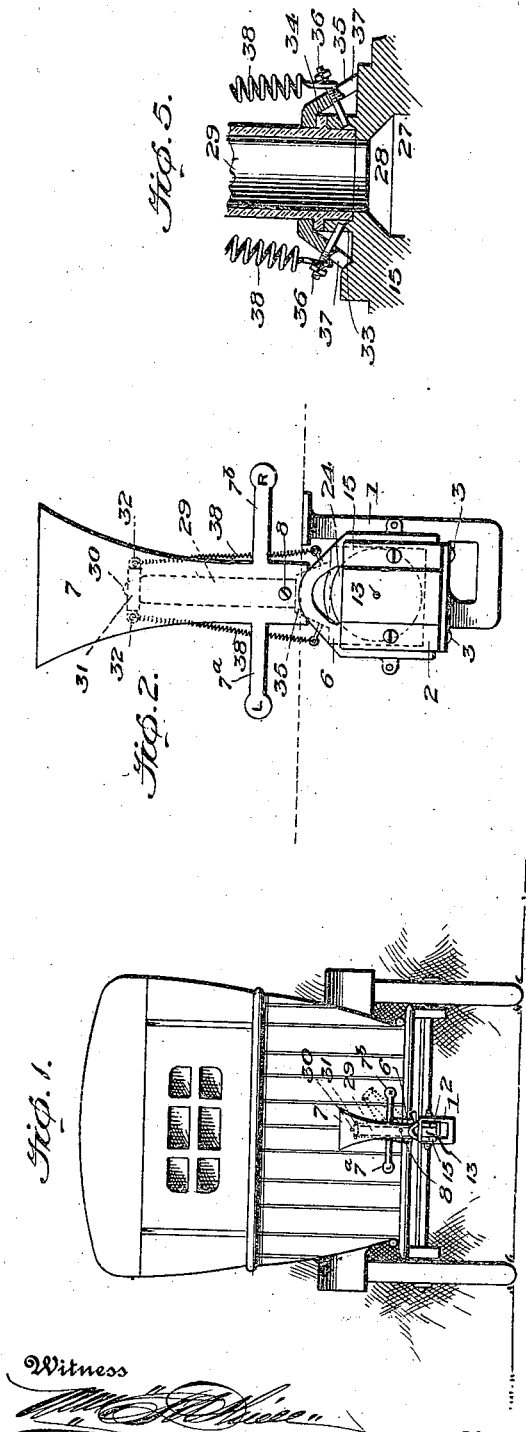
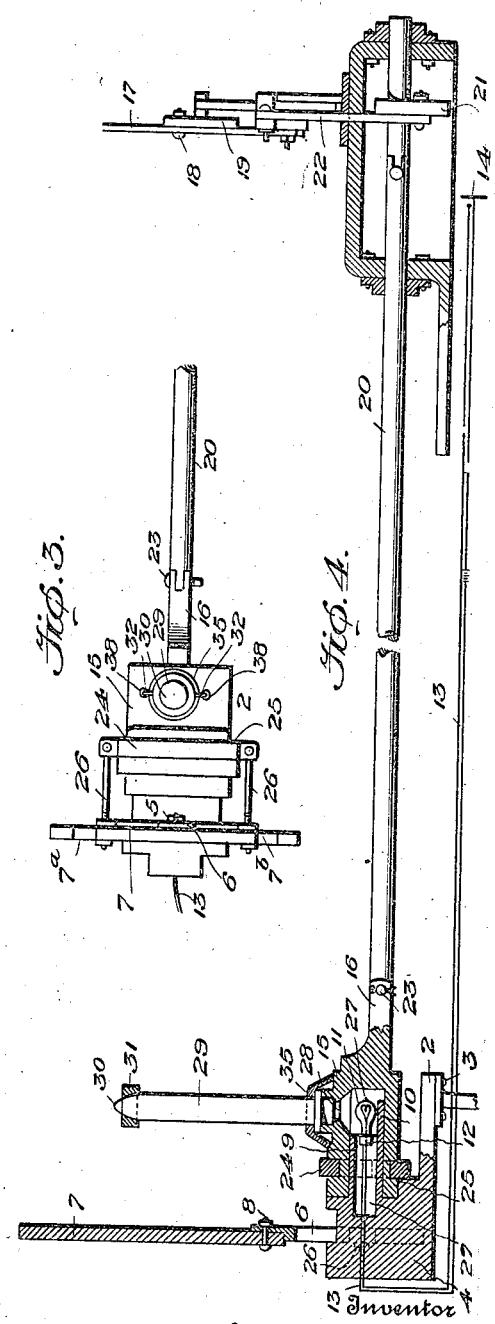
Witness
Inventor
George Logan
By
His Attorney

UNITED STATES PATENT OFFICE.

GEORGE LOGAN, OF WASHINGTON, DISTRICT OF COLUMBIA.

SIGNAL-LIGHT FOR AUTOMOBILES.

1,195,372.   Specification of Letters Patent.   Patented Aug. 22, 1916.

Application filed July 13, 1915. Serial No. 39,609.

*To all whom it may concern:*

Be it known that I, GEORGE LOGAN, a citizen of the United States, residing at Washington, District of Columbia, have invented certain new and useful Improvements in Signal-Lights for Automobiles, of which the following is a specification.

This invention relates to signal lights for automobiles.

My object is to provide a simple, durable and efficient signal light of improved construction adapted for use at the rear of automobiles and other vehicles and designed to indicate, by day or by night, whether the automobile or vehicle is to proceed straight ahead or to turn to the left or to the right.

My invention serves as a visual signal by day or by night and embodies a swinging arm which serves as a plain semaphore during the day and as an illuminated semaphore at night, the relationship of the swinging semaphore to a fixed semaphore or obscuring device, serving to indicate whether the vehicle will proceed directly ahead, or, turn to the right or to the left, or stop.

In another respect, the present invention embodies an improvement in the form and manner of illumination of the swinging semaphore, whereby the swinging semaphore is rendered luminous throughout and the source of light is housed and protected against injury. By this improved construction, the source of illumination, which may be an electric incandescent lamp controlled by a switch so that it can be cut out during the day, is stationary, housed and protected, and the swinging semaphore is a transparent arm, preferably suitably colored, which is rockably, preferably detachably, mounted in relation to the source of light and is itself mounted in an improved manner so that in case of breakage or desire to change from one color to another, substitution may be readily made. Improved means are employed for mounting the swinging semaphore and to adapt the parts to be readily disconnected or assembled.

The signal is preferably mounted in a detachable manner on a bracket or hanger carried at the rear of the frame or chassis of the car so that it is readily accessible and can be removed when desired. Any suitable means may be employed for swinging or operating the signal, one suitable device being a hand lever suitably positioned for operation by the driver of the car and connected to a rock shaft running beneath the car body and having a detachable coupling to the signal, thus permitting the semaphore signal to be removed from the hanger or bracket without disturbing the operating means.

I am aware that modifications may be resorted to in carrying out my invention and I do not restrict myself to the details of construction hereinafter set forth and shown in the drawings, except where specified in the claim.

One embodiment of the invention is set forth hereinafter and disclosed in the accompanying drawings, in which—

Figure 1 is a view of the rear of an automobile, equipped with my invention; Fig. 2, a detail rear elevation of the signal, with the movable semaphore obscured; Fig. 3, a plan view, the parts being in the position shown in Fig. 2; Fig. 4, a longitudinal section with certain parts broken away and in full lines showing one way in which the signal may be operated; and Fig. 5, a detail section showing the seating and connections for the illuminated semaphore arm.

Secured to and depending from the rear of the frame or chassis of the car is a bracket or hanger 1 to which the base 2 of the signal may be detachably connected by bolts 3, enabling the entire signal to be removed without detaching the bracket 1 from the frame. The base has a part 4 to which is secured by bolts 5, the fork 6. The stationary semaphore 7 is detachably secured to the fork 6 at 8, thus enabling any desired stationary semaphore or obscuring device to be employed. The one illustrated is a flat paddle provided with arms $7^a$, $7^b$, extending in opposite directions and bearing any suitable indicia such as "L" and "R" to indicate, when the swinging semaphore is operated, the direction in which the vehicle will turn. When the vehicle is to proceed straight ahead, the position of the movable or swinging semaphore will be vertical and it will then be obscured by the obscuring device or stationary semaphore 7.

Projecting forwardly from the part 4 is a hollow hub 9 provided with a lip or extension 10. The illuminating device 11 which is preferably an electric incandescent light, is disposed over the lip 10 and held in a lamp socket 12 contained within the hub 9 and connected by suitable wires 13 with any source of current and controlled by a switch 14 so that the light may be extinguished during the day or at times when not needed. The extension 10 may be provided with any suitable reflecting surface or device, if preferred.

Rotatably or rockably mounted on the hub 9 is the semaphore carrier and lamp housing 15 which is provided with a shaft section 16 by which it may be rocked or turned by any suitable operating mechanism, one example of which is that shown, consisting of a hand lever 17 provided with locking means 18, a rocker 19 connected to the hand lever, a shaft 20, and a rocker 21 connected by links 22 to the rocker 19. The hand lever 17 may be disposed in any suitable position convenient for use by the driver of the car and the shaft 20 may extend under the body of the car rearwardly to a position convenient for coupling it to the shaft section 16. A detachable coupling 23 is provided so that the shaft section 16 may be disconnected whenever it is desired to remove the signal from the rear of the car, as for instance, when necessary to make repairs or to substitute an electric light for the light 11.

Any suitable means may be employed for holding the semaphore carrier and lamp housing 15 on the hub 9; one such device is a split collar 24 received in an annular groove 25 in the part 15 and bolts 26 connecting the split collar 24 to the fork 6. The semaphore carrier and lamp housing 15 is hollow inside at 27 and its interior may be coated or provided with any suitable reflecting surface. The lamp 11 is disposed within the hollow interior of the part 15 in position so that the light will be directed to an opening 28 and thence into the transparent tubular semaphore arm 29. The arm 29 is preferably of glass and may be colored as desired, red being preferred. The outer end 30 is preferably closed and tapered. The collar 31 surrounds the end 30 and is provided with hooks 32. The lower end of the semaphore arm 29 is seated around the opening 28 and within a shell or hub 33 and is also provided with a collar 34. A sleeve 35 surrounds the semaphore arm 29 and bears against the collar 34 and in turn telescopes over the shell 33 and is adapted to be detachably held by screw bolts 36 received in notches 37. The semaphore arm 29 is thus detachably and securely connected to the carrier 15. To cushion and take up shocks or jars, so as to prevent accidental breakage of the semaphore arm 29, there are provided coil springs 38 which connect the hooks 32 to the screw bolts 36.

When the lever 17 is in vertical position, the semaphore arm 29 is directly in the rear of the obscuring paddle or semaphore 7 and is hidden from the view of persons in the rear of the automobile. The signal then indicates that the car is proceeding straight ahead. When the lever 17 is swung in one direction, the shaft 20 is turned and with it are rotated the carrier 15 and the semaphore 29, thus disposing the semaphore 29 in horizontal position to one side or the other of the obscuring semaphores 7 and indicating the direction toward which the car will turn (Fig. 1). To signal that the car is to stop, the lever 17 will be rocked back and forth to oscillate the semaphore 29 up and down.

During the day, the lamp 11 will not be illuminated, the relative positions of the semaphores 7 and 29 thus indicating the direction of travel of the car. At night, the current is switched into the lamp and the light therefrom is reflected into the transparent semaphore 24 illuminating it. As the lamp does not turn with the semaphore 29 or the carrier 15, but is housed and protected, there is no danger of breakage of the lamp. On the other hand, by using the elongated transparent semaphore 29, the entire length thereof is illuminated when the lamp is burning, thus providing a very clear signal which, having suitable length, serves as an illuminated pointer which is easily observable.

Should the semaphore 29 become broken, a new one can be substituted without disturbing the other parts of the signal.

Having thus described my invention, what I claim as new and desire to secure by Letters Patent, is:—

In a signal for automobiles, the combination with a stationary lamp, of a rockably mounted semaphore carrier and lamp housing receiving said lamp and provided with an opening, an elongated tubular transparent semaphore seated against the carrier and arranged to receive light from said lamp through said opening, said semaphore having a collar, a shell surrounding the base of the tubular semaphore and engaging the collar, fastenings detachably connecting the shell to said semaphore carrier, a collar engaged with the tubular semaphore, and coil springs connecting the collar to the aforesaid shell.

In testimony whereof, I hereunto affix my signature.

GEO. LOGAN.